United States Patent [19]

Nakamaru et al.

[11] Patent Number: 5,433,870

[45] Date of Patent: Jul. 18, 1995

[54] MULTILAYERED SLIDING MEMBER

[75] Inventors: Takashi Nakamaru, Kanagawa; Tadashi Watai, Ayase; Akihiko Okimura, Yokohama; Sumihide Yanase, Ebina, all of Japan

[73] Assignee: Oiles Corporation, Tokyo, Japan

[21] Appl. No.: 125,160

[22] Filed: Sep. 23, 1993

[30] Foreign Application Priority Data

Sep. 25, 1992 [JP] Japan ................................ 4-279166

[51] Int. Cl.⁶ ................ C10M 107/38; C10M 103/06
[52] U.S. Cl. ...................... 252/12.4; 252/12; 252/25
[58] Field of Search ............. 252/12, 12.2, 12.4, 252/12.6, 25

[56] References Cited

U.S. PATENT DOCUMENTS

| | | | |
|---|---|---|---|
| 3,376,183 | 4/1968 | Flynn et al. | 252/12.2 |
| 4,000,982 | 1/1977 | Ueda | 252/12.2 |
| 4,277,200 | 7/1981 | Speakman | 252/12 |
| 4,312,772 | 1/1982 | Mori | 252/12 |
| 4,626,365 | 12/1986 | Mori | 252/12 |
| 4,655,944 | 4/1987 | Mori | 252/12.2 |
| 5,091,078 | 2/1992 | Tanaka et al. | 252/12.2 |

FOREIGN PATENT DOCUMENTS

| | | |
|---|---|---|
| 3520068 | 12/1985 | Germany . |
| 39-16950 | 8/1964 | Japan . |
| 2-203031 | 8/1990 | Japan . |

OTHER PUBLICATIONS

Database WPI, Qwwk 9237, Derwent Publication Ltd., London, GB; AN-92-304424, & PJ-A-4 210 123 (Taiho Kogyo) 31 Jul. 1992. Abstract.

Patent Abstracts of Japan, col 016, No. 025 (C-903) 22 Jan. 1992, & JP A-03 239 756 (Sutaaraito) 25 Oct. 1991. Abstract.

*Primary Examiner*—Prince Willis, Jr.
*Assistant Examiner*—James M. Silbermann
*Attorney, Agent, or Firm*—Nixon & Vanderhye

[57] ABSTRACT

Disclosed herein is a multilayered sliding member comprising a lubricating composition comprising polytetrafluoroethylene and 1 to 40 wt % of (i) zinc oxide whiskers or (ii) zinc oxide whiskers and fibrous magnesium oxysulfate, fan-shaped magnesium oxysulfate or a mixture thereof used as a filler; and a porous sintered metal layer formed on a steel backing, the lubricating composition being impregnated in and coated on the porous sintered metal layer formed on a steel backing.

19 Claims, No Drawings

MULTILAYERED SLIDING MEMBER

BACKGROUND OF THE INVENTION

The present invention relates to a multilayered sliding member having in the sliding surface thereof a lubricating composition mainly composed of polytetrafluoroethlene (hereinafter abbreviated as PTFE). Particularly, the present invention relates to a multilayered sliding member such as guide bush for shock absorber and bearing for hydraulic pump, which have in the sliding surface thereof a lubricating composition mainly composed of PTFE and exhibit excellent sliding characteristics in use in oil or under oil lubrication.

PTFE has been widely used as a starting material sliding members such as bearings for its peculiar characteristic properties such as excellent self-lubricating properties, low coefficient of friction, and high chemical and heat resistance. However, a sliding member made of PTFE alone is poor in wear resistance and creep resistance. To overcome this problem, several measures have been taken according to the purpose of use of the sliding members, such as (1) the blending of a filler such as graphite, molybdenum disulfide, glass fiber, etc., to PTFE, and (2) the impregnating and coating of a lubricating composition in and on a porous sintered metal layer deposited integrally on a thin steel plate.

A sliding member concerning the above-mentioned (2) is proposed in JP-B-39-16950. This JP-B-39-16950 discloses a bearing material comprising a matrix composed of a porous copper or copper alloy layer which may be disposed on a steel backing, and a mixture of polytetrafluoroethylene and lead and/or an oxide thereof, which the mixture is impregnated at least at the exposed face of the porous copper or copper alloy layer, the amount of this mixture being not less than 28% in volume based on the matrix, and the amount of lead or lead and an oxide thereof being at least 16% in volume based on the matrix.

However, the conventional sliding members such as disclosed in the above, although are low in coefficient of friction and admirable in frictional properties, were not necessarily satisfactory in wear resistance. Also, the conventional sliding members had the problem that in use in oil, particularly in a state of high-speed sliding, the sliding surface was prone to damage by cavitation caused in such sliding, promoting abrasion of the sliding member.

As a result of the present inventors' earnest studies for overcoming the above prior art problems, it has been found that a multilayered sliding member obtained by scattering and spreading a wet lubricating composition comprising a mixture of polytetrafluoroethylene and 1 to 40 wt % of (i) zinc oxide whiskers or (ii) zinc oxide whiskers and fibrous magnesium oxysulfate and/or fan-shaped magnesium oxysulfate as a filler and a petroleum solvent, on a porous sintered metal layer formed on a steel backing, rolling the resultant product by a roller so as to obtain a lubricating composition impregnated in and coated on the sintered metal layer, followed by heating to evaporate away the petroleum solvent in the lubricant composition, and then baking the resulting product by heating at a temperature of 360° to 380° C., shows a more low and stable coefficient of friction under oil lubrication, and also exhibits more excellent wear-resistant and anti-cavitation properties. The present invention has been attained on the basis of this finding.

SUMMARY OF THE INVENTION

It is an object of the present invention to provide a multilayered sliding member having more excellent friction and wear-resistant properties and also showing more excellent anti-cavitation properties in use in oil in a state of high-speed sliding.

In a first aspect of the present invention, there is provided a multilayered sliding member comprising a lubricating composition comprising polytetrafluoroethylene and 1 to 40 wt % of (i) zinc oxide whiskers or (ii) zinc oxide whiskers and fibrous magnesium oxysulfate, fan-shaped magnesium oxysulfate or a mixture thereof used as a filler; and a porous sintered metal layer formed on a steel backing, the lubricating composition being impregnated in and coated (spreaded) on the porous sintered metal layer formed on a steel backing.

In a second aspect of the present invention, there is provided a multilayered sliding member comprising a lubricating composition comprising polytetrafluoroethylene, 1 to 40 wt % of (i) zinc oxide whiskers or (ii) zinc oxide whiskers and fibrous magnesium oxysulfate, fan-shaped magnesium oxysulfate or a mixture thereof as a first filler, and 1 to 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total amount of the first and second fillers in the lubricating composition being not more than 40 wt %; and a porous sintered metal layer formed on a steel backing, the lubricating composition being impregnated in and coated (spreaded) on the porous sintered metal layer formed on a steel backing.

DETAIL DESCRIPTION OF THE INVENTION

The backing used in the present invention is a thin metal plate. Usually a thin plate of structural rolled steel is used, but other types of thin steel plate or thin plates of other metals than steel can be used according to the purpose of use of the sliding member produced. The above thin metal plates subjected to a specific treatment such as copper plating for improving corrosion resistance are also usable.

The porous sintered metal layer formed integrally on the backing in the present invention is usually composed of a copper alloy with excellent friction abrasion properties, such as bronze, leaded bronze, phosphor bronze, etc. But it is possible to use other substances than copper alloys, such as aluminum alloy, iron, etc., according to the purpose of use of the sliding member. The powder shape of these alloys used in the present invention is preferably spherical or an irregular particle-form such as granular.

The porosity of the porous sintered metal layer used in the present invention is not less than 25%, preferably 28 to 35%. The sintered metal layer having a porosity in the above-defined range can be obtained by sintering a metal powder of a particle size which can pass a 80-mesh screen but can not pass a 350-mesh screen.

As PTFE used as a main component of the lubricating composition of the present invention, there is usually used a fine powder (e.g. "Teflon 6CJ", produced by Mitsui Du Pont Fluorochemical Co., Ltd.; "Polyflon F201", produced by Daikin Industries, Ltd.; and "Fluon CD-076, CD-126 and CD-4", produced by Asahi Glass Co., Ltd.). It is also possible to use a mixed powder obtained by mixing the fine powder with a molding powder (e.g. "Teflon 7AJ", produced by Mitsui Du Pont Fluorochemical Co., Ltd.) in an amount of the molding powder of not more than 70 parts by weight based on 100 parts by weight of the fine powder.

The content of PTFE in the lubricating composition is the balance, preferably 40 to 99 wt %, more preferably 65 to 85 wt %.

The zinc oxide whiskers and magnesium oxysulfate used as a first filler for lubricating composition of the present invention are assumed the roles of supplying the defect of PTFE, which is poor in the wear resistance and elevating retainability of the oil film in use in oil or under oil lubrication, while bettering the anti-cavitation properties and improving dispersibility of the other filler.

The zinc oxide whiskers has a tetrapod-like three-dimensional structure which is composed of a core part and needle-like crystal parts which extend from the core part to different four outer-directions. The diameter of the core part thereof is 1 to 15 $\mu$m. The diameter of the base of the needle-like crystal part is 0.7 to 14 $\mu$m and the length of the needle-like crystal part is 3 to 200 $\mu$m. A typical example of such zinc oxide whiskers is "PANATETRA", produced by Matsushita Amtec Co., Ltd.

The content of the zinc oxide whiskers in the lubricating composition is 1 to 40 wt %, preferably 10 to 30 wt %. When the content is less than 1 wt %, it is unable to impart desired wear resistance, anti-cavitation properties, and oil film retainability to the lubricating composition, and when the content is more than 40 wt %, the workability of the lubricating composition is deteriorated.

The magnesium oxysulfate is a basic magnesium sulfate hydrate represented by the chemical formula: $MgSO_4 \cdot 5MgO \cdot 8H_2O$ or $MgSO_4 \cdot 5Mg(OH)_2 \cdot 3H_2O$, and is fibrous type magnesium oxysulfate and fan-shaped type magnesium oxysulfate. The fan-shaped type is composed of the crystals grown to a fan-like configuration comprising the acicular crystals bundled together (refer to photograph 3 in "The Properties and Applications of Fibrous Magnesium Hydroxide Sulfate Hydrate 'MOS-HIGE', Annal. High Perform. Paper Soc., No. 27, November, 1988, pp. 26-31). In view of dispersibility in PTFE and processability in impregnation and coating of the lubricating composition in and on the porous sintered metal layer, the fan-shaped magnesium oxysulfate is preferred.

This magnesium oxysulfate contains crystal water as noticed from the above chemical formula, so that when this compound is blended as it is in PTFE to form a lubricating composition, there could take place release of crystal water in the course of baking of the lubricating composition depending on the quantity of the compound blended. Such release of crystal water may cause formation of pinholes in the sliding surface. These pinholes, although giving no adverse effect to the sliding properties, may cause a reduction of adhesiveness of the lubricating composition to the sintered metal layer, so that it is preferable to heat-treat the magnesium oxysulfate at a temperature of 300° to 500° C. so as to have the crystal water released before this compound is blended in PTFE.

As the fibrous crystal-type magnesium oxysulfate used in the present invention, the one having an average length (major axis diameter) of 1 to 1,000 $\mu$m, preferably 10 to 200 $\mu$m, an average diameter (minor axis diameter) of 0.1 to 10 $\mu$m, preferably 0.1 to 1 $\mu$m, and an aspect ratio (average major axis diameter/average minor axis diameter) of 10 to 200, preferably 10 to 100 can be used. As the fan-shaped crystal-type magnesium oxysulfate used in the present invention, the one having an average length of 10 to 200 $\mu$m, preferably 50 to 200 $\mu$m, an average diameter of the pivot of the fan-shaped type magnesium oxysulfate is 1 to 10 $\mu$m, preferably 2 to 8 $\mu$m, and an average length of the arc of the fan-shaped type magnesium oxysulfate is 20 to 100 $\mu$m, preferably 40 to 80 $\mu$m. A typical example of such magnesium oxysulfate is "MOS-HIGE", produced by Ube Industries, Ltd.

The content of magnesium oxysulfate in the lubricating composition is not more than 20 wt %, preferably 1 to 20 wt %, more preferably 10 to 15 wt %. When the content exceeds 25 wt %, workability of the composition may be deteriorated. Further, the content of magnesium oxysulfate is preferably not more than 100 parts by weight based on 100 parts by weight of the zinc oxide whiskers.

The total amount of the zinc oxide whiskers and magnesium oxysulfate in the lubricating composition is 1 to 40 wt %, preferably 10 to 35 wt %. If the content is less than 1 wt %, it is unable to impart desired wear resistance, anti-cavitation properties, and oil film retainability to the lubricating composition If the content is more than 40 wt % the workability of the lubricating composition is deteriorated.

In order to further enhance wear resistance and oil film retainability of the lubricating composition comprising PTFE and as a first filler (i) zinc oxide whiskers or (ii) zinc oxide whiskers and magnesium oxysulfate, there may be blended, in addition to the first filler, at least one compound selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler. Among these compounds, magnesium oxide, magnesium hydroxide, magnesium silicate, fluorine-contained mica and zinc oxide are preferred for the purpose of further enhancing oil-film retainability of the lubricating composition.

These second fillers have an oil adsorbing property. When the sliding member is in use in oil or under oil lubrication, they function to adsorb oil on the sliding surface to encourage formation of an oil film on the sliding surface, while securing retention of the oil film on the sliding surface. Thus, blending of the second filler contributes to formation of an always stable lubricating oil-film on the sliding surface and allows the produced sliding member to exhibit the excellent sliding characteristics under oil lubrication.

The average particle size of the second filler is not greater than 20 $\mu$m, preferably 1 to 10 $\mu$m.

The effect of blending of the second filler becomes recognizable at the content of 1 wt % and is maintained until the content of 20 wt %. However, when its content exceeds 20 wt %, although the oil film forming and oil film retaining properties are maintained, adverse effect is given to workability of the sliding member. Therefore, the content of the second filler in the lubricating composition is not more than 20 wt %, preferably 1 to 20 wt %, more preferably 1 to 15 wt %, still more preferably 5 to 10 wt %. It should, however, be decided in accord with the blending ratio of the first filler.

It is to be noted that, in the present invention, when the total content of the first filler and the second filler exceeds 40 wt %, adverse effect is given to workability of the lubricating composition such as expandability, and impregnation and coating characteristics for the porous sintered metal layer. Therefore, the total amount of the first and second fillers in the lubricating composition is not more than 40 wt %, preferably 10 to 35 wt %, more preferably 20 to 30 wt %.

In the lubricating composition composed of (a) PTFE and the first filler, or (b) PTFE, the first filler and the second filler, other fluorine resin(s) than PTFE may be blended for the purpose of further improving wear resistance and anti-cavitation properties.

Examples of such fluorine resins are tetrafluoroethylene-perfluoroalkylvinyl ether copolymer (hereinafter referred to as PFA), tetrafluoroethylene-hexafluoropropylene copolymer (hereinafter referred to as FEP), tetrafluoroethylene-ethylene copolymer (hereinafter referred to as ETFE), polychlorotrifluoroethylene (hereinafter referred to as PCTFE), chlorotrifluoroethylene-ethylene copolymer (hereinafter referred to as ECTFE), polyvinylidene fluoride (hereinafter referred to as PVDF) and polyvinyl fluoride (hereinafter referred to as PVF).

The content of fluorine resin in the lubricating composition is not more than 30 wt %, preferably 0.1 to 30 wt %, more preferably 0.1 to 20 wt %. If the content exceeds 30 wt %, the sliding properties deteriorate, and especially coefficient of friction are elevated, resulting in reducing the sliding stability.

Further, in the lubricating composition of the present invention composed of (a) PTFE and the first filler, (b) PTFE, the first filler and the second filler, (c) PTFE, the first filler and the fluorine resin, or (d) PTFE, the first filler, the second filler and the fluorine resin, there may be blended at least one selected from the group consisting of lead, zinc, tin, copper and alloys thereof as a metallic filler for further improving sliding stability and wear resistance.

The metallic filler used in the present invention is preferably a powder having an average particle size of 10 to 80 μm, and the content thereof in the lubricating composition is not more than 30 wt %, preferably 0.1 to 30 wt %, more preferably 10 to 20 wt %.

The composition of the lubricating composition of the present invention may be exemplified as follows.

(1) A lubricating composition comprises 60 to 99 wt % of polytetrafluoroethylene; and 1 to 40 wt % of (i) zinc oxide whiskers or (ii) zinc oxide whiskers and fibrous magnesium oxysulfate, fan-shaped magnesium oxysulfate or a mixture thereof.

(2) A lubricating composition comprises 60 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof as a first filler; and not more than 20 wt %, preferably 1 to 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total content of the first and second fillers in the composition being not more than 40 wt %.

(3) A lubricating composition comprises 50 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof; and not more than 30 wt %, preferably 0.1 to 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride.

(4) A lubricating composition comprises 50 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof as a first filler; not more than 20 wt %, preferably 1 to 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total content of the first and second fillers in the composition being not more than 40 wt %; and not more than 30 wt %, preferably 0.1 to 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride (5) A lubricating composition comprises 40 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof; and not more than 30 wt %, preferably 0.1 to 30 wt % of at least one metallic filler selected from the group consisting of lead, zinc, tin, copper and an alloy thereof.

(6) A lubricating composition comprises 40 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof as a first filler; not more than 20 wt %, preferably 1 to 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total content of the first and second fillers in the composition being not more than 40 wt %; and not more than 30 wt %, preferably 0.1 to 30 wt % of at least one metallic filler selected from the group consisting of lead, zinc, tin, copper and an alloy thereof.

(7) A lubricating composition comprises 40 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof; not more than 30 wt %, preferably 0.1 to 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride; and not more than 30 wt %, preferably 0.1 to 30 wt % of at least one metallic filler selected from the group consisting of lead, zinc, tin, copper and an alloy thereof.

(8) A lubricating composition comprises 40 to 99 wt % of polytetrafluoroethylene; 1 to 40 wt % of (i) zinc oxide whiskers or (ii) zinc oxide whiskers and fibrous magnesium oxysulfate, fan-shaped magnesium oxysulfate or a mixture thereof as a first filler; not more than 20 wt %, preferably 1 to 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total content of the first and second fillers in the composition being not more than 40 wt %; not more than 30 wt %, preferably 0.1 to 30 wt % of a fluorine resin selected from the group consisting of tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride and polyvinyl fluoride; and not more than 30 wt %, preferably 0.1 to 30 wt % of at least one metallic filler selected from the group consisting of lead, zinc, tin, copper and an alloy thereof.

In the present invention, it is also possible to blend in the lubricating composition other filler(s) commonly used for more improving wear resistance of PTFE, for example, solid lubricant such as graphite, molybdenum disulfide, boron nitride and the like in an amount not exceeding 10 wt %, as well as those generally used for reinforcement, for example, fiber reinforcement such as carbon fiber, glass fiber, aramide fiber and the like in an amount not exceeding 10 wt %.

The process for producing the sliding member according to the present invention is described below.

Preparation of Lubricating Composition

A PTFE powder, 1 to 40 wt % of a first filler, not more than 20 wt % of a second filler, not more than 30 wt % of a fluorine resin other than PTFE and not more than 30 wt % of a metallic filler are mixed while pulverizing at a temperature not more than the transition point (19° C.) of PTFE, preferably at 10° to 18° C. To the resultant mixture maintained at a temperature not more than 19° C., preferably at 10° to 18° C., a petroleum solvent is added in an amount of 15 to 30 parts by weight based on 100 parts by weight of the mixture, followed by mixing with stirring to obtain a wet lubricating composition.

The petroleum solvents usable here include naphtha, toluene, xylene, aliphatic solvents, aliphatics and naphthenics mixed-solvents.

When the mixing ratio of the petroleum solvent in the wet lubricating composition is less than 15 parts by weight based on 100 parts by weight of the mixture, the expandability of the lubricating composition in the step of impregnation and coating for the porous sintered metal layer described later become bad, and impregnation and coating thereof tend to become non-uniform. On the other hand, when the mixing ratio of the petroleum solvent exceeds 30 parts by weight based on 100 parts by weight of the mixture, not only the impregnation and coating operation becomes difficult to perform, but also the coating thickness tends to become non-uniform or the adhesive strength between the lubricating composition and the sintered layer may be lowered.

By mixing at a temperature below the transition point of PTFE, it is possible to prevent fibrization of PTFE and to obtain a homogenous mixture.

Production of Sliding Member (a) A wet lubricating composition having wettability is scattered and spreaded on a porous sintered metal layer formed on a metallic backing and is rolled by a roller so as to obtain the composition impregnated in the sintered layer while forming a uniform coat of the composition on the surface of the sintered layer. In this step, the wet lubricating composition is coated to a thickness of 2 to 2.5 times the coating thickness required in the final product. Filling of the voids in the porous sintered metal layer with wet lubricating composition is substantially completed in this step.

(b) The backing having the porous sintered metal layer impregnated and coated with the wet lubricating composition is kept in a drying oven heated at a temperature of 200° to 250° C. for a few minutes to let the petroleum solvent disperse away, and then the dried lubricating composition is rolled down to a prescribed thickness by a pressure roll under a pressure of roughly 300 to 600 kg/cm$^2$.

(c) Then the backing having the rolled dry lubricating composition layer is placed in a heating oven heated at a temperature of 360° to 380° C. for several to ten and several minutes, and thereafter the baked product is taken out of the oven and again passed under the roll to adjust dimensional variation.

(d) After dimensional adjustment, the backing having the sliding surface layer formed thereon is cooled and, if necessary, passed between the correcting rolls for correcting undulation and/or other deformation of the backing, thereby finally obtaining a desired multilayered sliding member.

This multilayered sliding member, in the form of a flat plate, may be cut to a suitable size for use as a sliding plate, or it may be bent roundly to form a cylindrical spiral bush.

The thickness of the porous sintered metal layer in the multilayered sliding member according to the present invention is 0.1 to 0.35 mm, and the thickness of the sliding surface layer formed from the above-described lubricating composition is 0.02 to 0.15 mm.

The coefficient of friction of the multilayered sliding member of the present invention, as determined in a Reciprocating Sliding Test conducted under the conditions of sliding speed of 5 m/min, loading of 125 kgf/cm$^2$ and testing time of 8 hours, is 0.005 to 0.050, preferably 0.005 to 0.040, and the abrasion amount in the above test is not more than 40 μm, preferably not more than 30 μm, more preferably not more than 20 μm, still more preferably not more than 15 μm.

The coefficient of friction of the multilayered sliding member of the present invention, as determined in a Reciprocating Sliding Test conducted under the conditions of sliding speed of 40 m/min, loading of 60 kgf/cm$^2$ and testing time of 8 hours, is 0.005 to 0.050, preferably 0.005 to 0.040, and the abrasion amount in the above test is not more than 60 μm, preferably not more than 50 μm, more preferably not more than 40 μm.

Also, the coefficient of friction of the present sliding member, as determined in a Radial Journal test conducted in a high-temperature (100° C.) oil (ATF-DII, produced by Idemitsu Sekiyu Co., Ltd.) under the conditions of sliding speed of 8.05 m/min, loading of 363.6 kgf/m$^2$ and testing time of 5 hours, is 0.005 to 0.020, preferably 0.005 to 0.015, and the abrasion amount in such test sliding is not more than 30 μm, preferably not more than 20 μm, more preferably not more than 15 μm.

The lubricating composition impregnated in and coated on a porous sintered metal layer formed on a backing according to the present invention shows a low and stable coefficient of friction, and also exhibits excellent wear-resistant properties and anti-cavitation properties, especially under oil lubrication or in high-temperature oil.

EXAMPLES

The present invention is described in further detail below with reference to the examples thereof. These examples, however, are not to be taken as limiting the scope of the invention in any way.

The measurement methods of the sliding characteristics shown in Examples are set forth below and the measurement method of anti-cavitation properties in Examples is set forth below.

(1Coefficient of Friction and Abrasion Amount

Reciproceting Sliding Test I

Each of the sliding members was subjected to a Reciproceting Sliding Test (I) under the following conditions.

Regarding coefficient of friction, the value of coefficient of friction in the range of after one hour from the start of the test to the end of the test was shown, and as for abrasion amount, the amount of dimensional change of the sliding surface after the 8-hour test period was measured.

| Sliding conditions: | |
|---|---|
| Sliding speed | 5 m/min |
| Loading | 125 kgf/cm$^2$ |
| Testing time | 8 hours |
| Stroke | 200 mm |
| Lubricant | Application of ATF-D II, produced by Idemitsu Sekiyu Co., Ltd. |
| Mating member | Cr-plated carbon steel for machine structure use (S45C) |

Reciprocating Sliding Test II

Each of the sliding members was subjected to a Reciproceting Sliding Test (II) under the following conditions.

Regarding coefficient of friction, the value of coefficient of friction in the range of after one hour from the start of the test to the end of the test was shown, and as for abrasion amount, the amount of dimensional change of the sliding surface after the 8-hour test period was measured.

| Sliding conditions: | |
|---|---|
| Sliding speed | 40 m/min |
| Loading | 60 kgf/cm$^2$ |
| Testing time | 8 hours |
| Lubricant | Application of ATF-D II, produced by Idemitsu Sekiyu Co., Ltd. |
| Mating member | Cr-plated Carbon steel for machine structure use (S45C) |

Radial Journal Test in High Temperature Oil

Each of the sliding members was subjected to a Radial Journal test in high-temperature oil under the following conditions.

Regarding coefficient of friction, the value of coefficient of friction in the range of after one hour from the start of the test to the end of the test was shown, and as for abrasion amount, the amount of dimensional change of the sliding surface after the 8-hour test period was measured.

| Sliding conditions: | |
|---|---|
| Sliding speed (rotational speed) | 8.05 m/min |
| Loading | 363.6 kgf/cm$^2$ |
| Testing time | 5 hours |
| Lubricant | In high-temperature (100° C.) oil (ATF-DII, produced by Idemitsu Sekiyu Co., Ltd.) |
| Mating member | Cr—Mo-steel (SCM 415H) |

(2) Anti-Cavitation Properties

After the above-mentioned Reciproceting Sliding Test II, the exfoliation on the bearing surface layer was visually observed. The evaluation was made according to the following criterion.

A: No exfoliation
B: A few exfoliations
C: More than 3 exfoliations

Examples 1–8

A PTFE powder (Teflon 6CJ, produced by Mitsui Du Pont Fluorochemical Co., Ltd.; average particle diameter: not more than 80 μm) and zinc oxide whiskers (Panatetra, produced by Matsushita Amtec Co., ltd.) (abbreviate to ZnO whiskers) as a first filler(s) in amount shown in Table 1 were pulverized and mixed by a Henschel mixer. In the resulting mixed powder was blended an aliphatic/naphthenic mixed solvent (Exsol, produced by Exson chemical Co., Ltd.) in an amount of 20 parts by weight based on 100 parts by weight of the mixed powder, and they were mixed at a temperature not more than the transition point of the PTFE (i.e., 15° C.) to obtain a wet lubricating composition. This wet lubricating composition was scattered and spreaded on a porous sintered metal layer (thickness: 0.25 mm) formed on a thin steel backing plate (thickness: 0.70 mm) and was rolled down to a coating thickness of 0.25 mm to form a multilayered plate. This multilayered plate was kept in a 200° C. hot-air drying oven for 5 minutes to evaporate away the solvent, and then the dried lubricating composition layer was pressed down to a thickness of 0.15 mm by a roller under the pressure of 400 kg/cm$^2$.

The pressed multilayered plate was placed in a heating-oven heated, and baked at a temperature of 370° C. for 10 minutes and then again pressed by a roller. After dimensional adjustment and correction of deformation such as undulation, the plate was cut and bent to form a barrel-shaped sliding member of 10.0 mm (in inner radius)×20 mm (in length)×1.05 mm (in thickness).

The coefficient of friction and abrasion amount of the respective sliding member are shown in Table 2.

Examples 9–14

Barrel-shaped sliding members of 10.0 mm (in inner radius)×20 mm (in length)×1.05 mm (in thickness) were obtained in the same procedure as Example 1 using the same PTFE powder and as a first filler the same zinc oxide whiskers in amount shown in Table 1, and further adding as another first filler fan-shaped magnesium oxysulfate (MOS-HIGE, produced by Ube Industries, Ltd.) (abbreviate to MgSO4) in amount shown in Table 1.

The coefficient of friction and abrasion amount of the respective sliding member are shown in Table 2.

Examples 15–25

Barrel-shaped sliding meadpets of 10.0 mm (in inner radius)×20 mm (in length)×1.05 mm (in thickness) were obtained in the same procedure as Example 1 using the same PTFE powder and as a first filler the same zinc oxide whiskers in amount shown in Table 1, and further adding as a second filler magnesium oxide particles of an average particle diameter of 2.0 μm (abbreviate to MgO), magnesium hydroxide particles of an average particle diameter of 1.0 μm (abbreviate to Mg(OH)2), magnesium silicate particles of an average particle diameter of 1.0 μm (abbreviate to MgSiO3), zinc oxide particles of an average particle diameter of 0.5 μm (abbreviate to ZnO), calcium fluoride particles of an average particle diameter of 3.0 μm (abbreviate to CaF2), barium sulfate particles of an average particle diameter of 4.5 μm (abbreviate to BaSO4), fluorine-contained mica particles (produced by Koupe Chemical Co., Ltd.) of an average particle diameter of 5.0 μm in amount shown in Table 1.

The coefficient of friction and abrasion amount of the respective sliding member are shown in Table 2.

Examples 26–29

Barrel-shaped sliding members of 10.0 mm (in inner radius)×20 mm (in length)×1.05 mm (in thickness) were obtained in the same procedure as Example 1 using the same PTFE powder, the same zinc oxide whiskers (first filler), the same magnesium oxysulfate (another first filler) and the same magnesium oxide particles (second filler) in amount shown in Table 1.

The coefficient of friction and abrasion amount of the respective sliding member are shown in Table 2.

Examples 30–33

Barrel-shaped sliding members of 10.0 mm (in inner radius)×20 mm (in length)×1.05 mm (in thickness) were obtained in the same procedure as Example 1 using the same PTFE powder, the same zinc oxide whiskers (first filler), and the same magnesium oxide particles (second filler) in amount shown in Table 1, and further adding as an other fluorine resin (FEP of an average particle diameter of 30 μm), PFA of an average particle diameter of 35 μm in amount shown in Table 1.

The coefficient of friction and abrasion amount of the respective sliding member are shown in Table 2.

Examples 34–45 and Comparative Example 1–2

Barrel-shaped sliding members of 10.0 mm (in radius)×20 mm (in length)×1.05 mm (in thickness) were obtained in the same procedure as Example 1 using the same PTFE powder, the same zinc oxide whiskers (first filler), the same magnesium oxysulfate (another first filler), the same magnesium oxide particles (second filler), the same FEP (other fluorine resin) and lead, copper, zinc, tin, copper-tin alloy and lead-tin alloy (abbreviate to Pb, Cu, Zn, Sn, Cu-Sn and Pb-Sn, respectively) of an average particle diameter of 30 to 40μm (metallic filler) in amount shown in Table 1.

Regarding the sliding members obtained in Examples, the Thrust test (I) were conducted. The results are shown in Table 2.

TABLE 1

| | | PTFE wt % | First filler wt % | | Second filler wt % | Fluorine resin wt % | Metallic filler wt % |
|---|---|---|---|---|---|---|---|
| | | | ZnO whiskers | Magnesium oxysulfate | | | |
| Examples | 1 | 95 | 5 | — | — | — | — |
| | 2 | 90 | 10 | — | — | — | — |
| | 3 | 85 | 15 | — | — | — | — |
| | 4 | 80 | 20 | — | — | — | — |
| | 5 | 75 | 25 | — | — | — | — |
| | 6 | 70 | 30 | — | — | — | — |
| | 7 | 65 | 35 | — | — | — | — |
| | 8 | 60 | 40 | — | — | — | — |
| | 9 | 85 | 10 | Fan-shaped 5 | — | — | — |
| | 10 | 75 | 20 | Fan-shaped 5 | — | — | — |
| | 11 | 65 | 30 | Fan-shaped 5 | — | — | — |
| | 12 | 80 | 10 | Fan-shaped 10 | — | — | — |
| | 13 | 70 | 15 | Fan-shaped 15 | — | — | — |
| | 14 | 60 | 20 | Fan-shaped 20 | — | — | — |
| | 15 | 85 | 10 | — | MgO 5 | — | — |
| | 16 | 85 | 10 | — | Mg(OH)2 5 | — | — |
| | 17 | 85 | 10 | — | MgSiO3 5 | — | — |
| | 18 | 85 | 10 | — | ZnO 5 | — | — |

TABLE 1-continued

| | | PTFE wt % | First filler wt % | | Second filler wt % | Fluorine resin wt % | Metallic filler wt % |
|---|---|---|---|---|---|---|---|
| | | | ZnO whiskers | Magnesium oxysulfate | | | |
| | 19 | 85 | 10 | — | $CaF_2$ 5 | — | — |
| | 20 | 85 | 10 | — | $BaSO_4$ 5 | — | — |
| | 21 | 85 | 10 | — | Fluorine-contained mica 5 | — | — |
| | 22 | 75 | 20 | — | MgO 5 | — | — |
| | 23 | 70 | 20 | — | MgO 10 | — | — |
| | 24 | 65 | 20 | — | MgO 15 | — | — |
| | 25 | 60 | 20 | — | MgO 20 | — | — |
| | 26 | 80 | 10 | Fan-shaped 5 | MgO 5 | — | — |
| | 27 | 70 | 15 | Fan-shaped 5 | MgO 10 | — | — |
| | 28 | 65 | 15 | Fan-shaped 10 | MgO 10 | — | — |
| | 29 | 60 | 20 | Fan-shaped 5 | MgO 15 | — | — |
| | 30 | 75 | 10 | — | MgO 5 | FEP 10 | — |
| | 31 | 65 | 10 | — | MgO 5 | FEP 20 | — |
| | 32 | 55 | 10 | — | MgO 5 | FEP 30 | — |
| | 33 | 65 | 10 | — | MgO 5 | PFA 20 | — |
| | 34 | 65 | 15 | — | — | FEP 20 | — |
| | 35 | 70 | 10 | Fan-shaped 5 | MgO 5 | FEP 10 | — |
| | 36 | 75 | 10 | Fan-shaped 5 | — | FEP 10 | — |
| | 37 | 55 | 10 | — | MgO 5 | FEP 10 | Pb 20 |
| | 38 | 60 | 10 | — | — | FEP 10 | Pb 20 |
| | 39 | 60 | 10 | — | — | — | Pb 30 |
| | 40 | 65 | 10 | — | MgO 5 | — | Pb 20 |
| | 41 | 60 | 10 | Fan-shaped 5 | MgO 5 | FEP 10 | Cu 10 |
| | 42 | 65 | 10 | Fan-shaped 5 | — | FEP 10 | Cu—Sn 15 |
| | 43 | 65 | 10 | Fan-shaped 10 | — | — | Pb—Sn 15 |
| | 44 | 70 | 10 | Fan-shaped 5 | — | — | Zn 15 |
| | 45 | 65 | 10 | Fan-shaped 5 | MgO 5 | — | Sn 15 |
| Comparative Examples | 1 | 70 | — | — | — | PFA 30 | — |
| | 2 | 80 | — | — | ZnO 20 | — | — |
| | 3 | 70 | — | — | — | — | Pb 30 |
| | 4 | 50 | — | — | MgO 20 | — | Pb 30 |

TABLE 2

| | | Coefficient of friction | Abrasion amount (μm) |
|---|---|---|---|
| Examples | 1 | 0.012–0.030 | 32 |
| | 2 | 0.015–0.031 | 24 |
| | 3 | 0.015–0.030 | 20 |
| | 4 | 0.015–0.030 | 16 |
| | 5 | 0.014–0.033 | 15 |
| | 6 | 0.015–0.032 | 12 |
| | 7 | 0.015–0.034 | 10 |
| | 8 | 0.016–0.035 | 15 |
| | 9 | 0.008–0.020 | 15 |
| | 10 | 0.010–0.020 | 12 |
| | 11 | 0.010–0.028 | 19 |
| | 12 | 0.008–0.020 | 14 |
| | 13 | 0.010–0.025 | 10 |
| | 14 | 0.014–0.030 | 23 |
| | 15 | 0.006–0.018 | 16 |
| | 16 | 0.010–0.025 | 20 |
| | 17 | 0.012–0.030 | 14 |
| | 18 | 0.010–0.020 | 18 |
| | 19 | 0.012–0.024 | 18 |
| | 20 | 0.012–0.030 | 20 |
| | 21 | 0.008–0.018 | 19 |
| | 22 | 0.005–0.020 | 15 |
| | 23 | 0.004–0.018 | 12 |
| | 24 | 0.005–0.018 | 18 |
| | 25 | 0.008–0.020 | 28 |
| | 26 | 0.005–0.020 | 12 |
| | 27 | 0.005–0.020 | 11 |
| | 28 | 0.006–0.021 | 15 |
| | 29 | 0.008–0.020 | 20 |
| | 30 | 0.008–0.015 | 7 |
| | 31 | 0.010–0.018 | 10 |
| | 32 | 0.010–0.022 | 15 |
| | 33 | 0.008–0.020 | 12 |
| | 34 | 0.005–0.020 | 15 |
| | 35 | 0.008–0.018 | 10 |
| | 36 | 0.006–0.020 | 14 |
| | 37 | 0.008–0.024 | 15 |
| | 38 | 0.010–0.028 | 20 |
| | 39 | 0.010–0.030 | 28 |
| | 40 | 0.010–0.022 | 13 |
| | 41 | 0.015–0.033 | 25 |
| | 42 | 0.012–0.030 | 20 |
| | 43 | 0.010–0.028 | 22 |
| | 44 | 0.008–0.025 | 18 |
| | 45 | 0.012–0.032 | 30 |
| Comparative Examples | 1 | 0.010–0.040 | 110 |
| | 2 | 0.008–0.025 | 66 |
| | 3 | 0.010–0.048 | 138 |
| | 4 | 0.005–0.030 | 82 |

The test results of the Reciprocating Sliding Test (I) show that the sliding member according to the Examples of the present invention were low in coefficient of friction and maintained a stable performance through the test period, and they were also very small in abrasion amount measured after the test.

On the other hand, the sliding member samples according to the Comparative Examples were rather unstable in coefficient of friction and suffered much abrasion wear in the above test, posing a problem on durability.

Regarding the sliding members obtained in Examples, the Reciprocating Sliding Test (II), the Radial Journal test in high-temperature oil and the cavitation test were conducted. The results are shown in Table 3 and 4.

TABLE 3

| Example No. | Reciproceting Sliding Test (II) | | Anti-cavitation properties |
|---|---|---|---|
| | Coefficient of friction | Abrasion amount (μm) | |
| Example 4 | 0.012–0.020 | 40 | A |
| Example 6 | 0.010–0.017 | 32 | A |
| Example 9 | 0.008–0.020 | 38 | A |
| Example 15 | 0.006–0.015 | 27 | A |
| Example 18 | 0.010–0.018 | 36 | A |
| Example 30 | 0.008–0.016 | 21 | A |
| Example 34 | 0.010–0.021 | 28 | A |
| Example 40 | 0.010–0.025 | 45 | A |
| Comparative Example 1 | 0.010–0.030 | 125 | C |

TABLE 4

| Example No. | Radial Journal test in high-temperature oil | |
|---|---|---|
| | Coefficient of friction | Abrasion amount (μm) |
| Example 1 | 0.010–0.020 | 18 |
| Example 4 | 0.007–0.016 | 12 |
| Example 6 | 0.006–0.015 | 8 |
| Example 9 | 0.008–0.018 | 10 |
| Example 10 | 0.006–0.014 | 10 |
| Example 15 | 0.008–0.015 | 20 |
| Example 18 | 0.008–0.016 | 14 |
| Example 26 | 0.006–0.015 | 25 |
| Example 30 | 0.008–0.014 | 8 |
| Example 31 | 0.009–0.015 | 6 |
| Example 34 | 0.008–0.015 | 10 |
| Example 35 | 0.006–0.010 | 7 |
| Example 38 | 0.009–0.016 | 26 |
| Example 40 | 0.008–0.015 | 24 |
| Example 44 | 0.010–0.020 | 28 |
| Comparative Example 3 | 0.010–0.032 | 110 |

As seen from the results of the Reciproceting Sliding Test (II) and the cavitation test, the sliding member samples according to the present invention had no influence of cavitation, were very small in abrasion amount and showed a stable performance with a low coefficient of friction maintained through the test time, even under a high-speed sliding condition.

As seen from the results of the Radial Journal test in high-temperature oil, the sliding member samples according to the present invention showed a stable performance with a low coefficient of friction maintained through the test time, and abrasion amount of these samples measured after the test was also very small.

What is claimed is

1. A multilayered sliding member comprising a lubricating composition comprising polytetrafluoroethylene and 1 to 40 wt % of zinc oxide whiskers and fibrous magnesium oxysulfate, fan-shaped magnesium oxysulfate or a mixture thereof used as a filler, and a porous sintered metal layer formed on a steel backing, the lubricating composition being impregnated in and coated on the porous sintered metal layer formed on a steel backing.

2. The multilayered sliding member according to claim 1, wherein the lubricating composition further contains not more than 30 wt % of a fluorine resin other than polytetrafluoroethylene.

3. The multilayered sliding member according to claim 1, wherein the lubricating composition further contains as a metallic filler not more than 30 wt % of at least one member selected from the group consisting of lead, zinc, tin, copper and alloys thereof.

4. The multilayered sliding member according to claim 1, wherein the zinc oxide whiskers have a tetrapod-like three-dimensional structure.

5. The multilayered sliding member according to claim 1, wherein the amount of the fibrous magnesium oxysulfate, the fan-shaped magnesium oxysulfate or a mixture thereof is not more than 20 wt %.

6. The multilayered sliding member according to claim 2, wherein the amount of polytetrafluoroethylene is 50 to 99 wt %.

7. The multilayered sliding member according to claim 3, wherein the amount of polytetrafluoroethylene is 40 to 99 wt %.

8. The multilayered sliding member according to claim 2, wherein the fluorine resin is tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride or polyvinyl fluoride.

9. The multilayered sliding member according to claim 3, wherein the average particle diameter of the metallic filler is 10 to 80 μm.

10. The multilayered sliding member according to claim 1, wherein the lubricating composition comprises polytetrafluoroethylene, 1 to 40 wt % of zinc oxide whiskers and fibrous magnesium oxysulfate, fan-shaped magnesium oxysulfate or a mixture thereof as a first filler, and not more than 20 wt % of at least one member selected from the group consisting of magnesium oxide, magnesium hydroxide, magnesium carbonate, magnesium silicate, zinc oxide, zinc carbonate, zinc sulfide, calcium fluoride, sodium fluoride, fluorine-contained mica and barium sulfate as a second filler, the total amount of the first and second fillers in the lubricating composition being not more than 40 wt %.

11. The multilayered sliding member according to claim 10, wherein the lubricating composition also contains not more than 30 wt % of a fluorine resin other than polytetrafluoroethylene.

12. The multilayered sliding member according to claim 10, wherein the lubricating composition also contains as a metallic filler not more than 30 wt % of at least one member selected from the group consisting of lead, zinc, tin, copper and alloys thereof.

13. The multilayered sliding member according to claim 10, wherein the zinc oxide whiskers have a tetrapod-like three-dimensional structure.

14. The multilayered sliding member according to claim 10, wherein the content of the fibrous magnesium oxysulfate, the fan-shaped magnesium oxysulfate or a fixture thereof is not more than 20 wt %.

15. The multilayered sliding member according to claim 11, wherein the content of polytetrafluoroethylene is 50 to 99 wt %.

16. The multilayered sliding member according to claim 12, wherein the content of polytetrafluoroethylene is 40 to 99 wt %.

17. The multilayered sliding member according to claim 10, wherein the average particle diameter of the second filler is not more than 20 μm.

18. The multilayered sliding member according to claim 11, wherein the fluorine resin is tetrafluoroethylene-perfluoroalkylvinyl ether copolymer, tetrafluoroethylene-hexafluoropropylene copolymer, tetrafluoroethylene-ethylene copolymer, polychlorotrifluoroethylene, chlorotrifluoroethylene-ethylene copolymer, polyvinylidene fluoride or polyvinyl fluoride.

19. The multilayered sliding member according to claim 12, wherein the average particle diameter of the metallic filler is 10 to 80 μm.

* * * * *